US009503000B2

(12) United States Patent
Suzuki

(10) Patent No.: US 9,503,000 B2
(45) Date of Patent: Nov. 22, 2016

(54) DRIVING DEVICE OF MULTI-PHASE MOTOR, DRIVING METHOD, COOLING DEVICE, AND ELECTRONIC APPARATUS

(71) Applicant: ROHM CO., LTD., Kyoto (JP)

(72) Inventor: Toshiya Suzuki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 170 days.

(21) Appl. No.: 14/453,900

(22) Filed: Aug. 7, 2014

(65) Prior Publication Data

US 2015/0042251 A1 Feb. 12, 2015

(30) Foreign Application Priority Data

Aug. 7, 2013 (JP) .................. 2013-164426

(51) Int. Cl.
*H02P 6/04* (2016.01)
*H02P 6/20* (2016.01)
*H02P 6/16* (2016.01)

(52) U.S. Cl.
CPC .. *H02P 6/20* (2013.01); *H02P 6/16* (2013.01)

(58) Field of Classification Search
CPC ............ H02P 6/182; H02P 6/20; H02P 6/16; H02P 7/28; H02P 21/34; H02P 6/06
USPC ............ 318/400.11, 400.03, 400.06, 400.26, 318/400.34, 400.37, 400.38, 778, 430
See application file for complete search history.

(56) References Cited

U.S. PATENT DOCUMENTS

| 7,095,204 B2* | 8/2006 | Lee | H02P 6/20 318/700 |
| 8,084,970 B2* | 12/2011 | Mullin | H02P 3/08 318/362 |
| 8,466,647 B2* | 6/2013 | Lee | H02P 6/182 318/400.01 |
| 8,836,254 B2* | 9/2014 | Dai | H02P 6/002 318/400.01 |
| 8,841,876 B2* | 9/2014 | Leaver | H02P 23/0081 318/701 |
| 8,917,041 B2* | 12/2014 | Kishimoto | H02P 6/16 318/400.14 |
| 2004/0263104 A1* | 12/2004 | Iwanaga | H02P 6/182 318/400.35 |
| 2005/0242765 A1* | 11/2005 | Ta | B62D 5/046 318/799 |
| 2011/0043146 A1* | 2/2011 | Sato | H02P 6/12 318/400.04 |
| 2012/0268047 A1* | 10/2012 | Suzuki | H02P 6/16 318/400.04 |

FOREIGN PATENT DOCUMENTS

| JP | H07031190 A | 1/1995 |
| JP | H07337080 A | 12/1995 |
| JP | 2001284868 A | 10/2001 |

* cited by examiner

*Primary Examiner* — Bentsu Ro
*Assistant Examiner* — Thai Dinh
(74) *Attorney, Agent, or Firm* — Cantor Colburn LLP

(57) ABSTRACT

A driving device of a multi-phase motor having a plurality of coils is provided. The driving device includes a back electromotive force (BEMF) detecting comparator connected to one of the plurality of coils to compare BEMF generated in one end of the one of the plurality of coils with a midpoint voltage of the plurality of coils and generate a BEMF detection signal, when the multi-phase motor starts to be driven; and an initial state detecting unit configured to detect a rotation state of the multi-phase motor based on the BEMF detection signal and a hall detection signal.

15 Claims, 6 Drawing Sheets

306b

DRIVING DEVICE OF MULTI-PHASE MOTOR, DRIVING METHOD, COOLING DEVICE, AND ELECTRONIC APPARATUS

CROSS-REFERENCE TO RELATED APPLICATIONS

This application is based upon and claims the benefit of priority from Japanese Patent Applications No. 2013-164426, filed on Aug. 7, 2013, the entire contents of which are incorporated herein by reference.

TECHNICAL FIELD

The present disclosure relates to a technique of driving a multi-phase motor.

BACKGROUND

As a demand for faster operating speed for personal computers and workstations has been increasing in recent years, there has been an increasing effort to achieve faster operating speed of a large scale integrated (LSI) circuit for computation such as a central processing unit (CPU) or a digital signal processor (DSP). Faster operating speed, i.e., a clock frequency, of such an LSI leads to an increase in a heating amount produced by the LSI. Such heating of the LSI may result in thermal runaway and affect surrounding circuits.

An example of a technique for cooling an LSI is an air cooling method using a cooling fan. In this method, for example, a cooling fan is disposed to face a surface of the LSI and blows cooling air to the surface of the LSI.

In many cases, a 3-phase brushless DC motor is used as a cooling fan. The 3-phase brushless DC motor (hereinafter, referred to simply as a "fan motor") is controlled by detecting a position of a rotor of the fan motor and sequentially changing conduction phases based on the position of the rotor.

As methods of driving a fan motor, a method of driving a fan motor using a hall sensor and a method of driving a fan motor using back electromotive force generated by a coil of the fan motor have been known. The driving method using a hall sensor is advantageous in that a position of a rotor can be accurately detected but disadvantageous in that the cost is increased due to the hall sensor. Further, a fan motor cannot be properly controlled when there is an error in operating the hall sensor.

The driving method using back electromotive force does not require a hall sensor, resulting in a low cost. Further, the driving method using the back electromotive force resolves shortcomings that a fan motor cannot be controlled in case of an error of a hall sensor. In this method, however, in order to detect the back electromotive force, voltage applied to a coil needs to be stopped during a non-conduction period including a timing at which a zero-crossing occurs to maintain a high impedance state. A driving waveform of a fan motor may be distorted due to the non-conduction period. This may lead to a noise.

A device for driving a fan motor may need to drive the fan motor with an appropriate sequence based on a state of the fan motor when the fan motor starts to be driven after power is supplied. That is, when the fan motor starts to drive, the fan motor may be in a stopped state, a forward idle rotation state in which the fan motor is idly rotating in a forward direction due to rotational inertia of a previous driving state of the fan motor, or a reverse idle rotation state in which the fan motor is idly rotating in a reverse direction due to a wind from the outside.

Thus, the device for driving a fan motor is required to have a function of detecting a state of a fan motor when the fan motor starts to be driven. This function may also be required in a multi-phase brushless DC motor, as well as in a fan motor.

SUMMARY

The present disclosure provides some embodiments of a device for driving a sensorless motor capable of accurately determining a state of the sensorless motor when the sensorless motor starts to be driven.

A certain aspect of the present disclosure relates to a device for driving a multi-phase motor. The driving device includes: a back electromotive force (BEMF) detecting comparator connected to one of the plurality of coils to compare BEMF generated in one end of the one of the plurality of coils with a midpoint voltage of the plurality of coils to generate a BEMF detection signal indicating a comparison result, when the multi-phase motor starts to be driven; and an initial state detecting unit configured to detect a rotation state of the multi-phase motor based on the BEMF detection signal and a hall detection signal corresponding to a result of comparing a pair of hall signals indicating a position of a rotor of the multi-phase motor, when the multi-phase motor starts to be driven.

According to this aspect, a state when a multi-phase motor starts to be driven can be detected.

The initial state detecting unit may be configured to determine whether the multi-phase motor idly rotates in a forward direction or in a reverse direction based on a phase relationship between the hall detection signal and the BEMF detection signal, when the multi-phase motor starts to be driven.

When a rotor idly rotates in a forward direction and when a rotor idly rotates in a reverse direction, a phase relationship between the hall detection signal and the BEMF detection signal is reversed. Thus, a direction of idle rotation can be detected based on phases of the hall detection signal and the BEMF detection signal.

The initial state detecting unit may include: a first counter configured to measure a first time duration including at least one of (i) a time duration from a first edge that is one of a positive edge and a negative edge of a predetermined signal selected from the BEMF detection signal and the hall detection signal to a second edge, that comes after the first edge and is one of a positive edge and a negative edge of the other signal different from the predetermined signal selected from the BEMF detection signal and the hall detection signal, and (ii) a time duration from a third edge that is the other edge of the predetermined signal to a fourth edge that is the other edge, that comes after the third edge, of the other signal; a second counter configured to measure a second time duration including at least one of (iii) a time duration from the second edge to the third edge and (iv) a time duration from the fourth edge to a fifth edge, that comes after the fourth edge and is one of the positive edge and the negative edge of the predetermined signal; and a determining unit configured to determine whether the multi-phase motor idly rotates in a forward direction or in a reverse direction, based on a magnitude relationship between the first time duration measured by the first counter and the second time duration measured by the second counter.

When the first time duration and the second time duration are measured by the first counter and the second counter, respectively, the determining unit may be configured to determine whether the multi-phase motor idly rotates in a forward direction or in a reverse direction.

In this case, such determination can be made within a shortest period of time.

The initial state detecting unit may include: a timing generating unit configured to generate a strobe signal asserted in synchronization with a predetermined one of the BEMF detection signal and the hall detection signal; and a determining unit configured to determine whether the multi-phase motor idly rotates in a forward direction or in a reverse direction based on a level of the other signal of the BEMF detection signal and the hall detection signal at a timing at which the strobe signal is asserted.

The initial state detecting unit may be configured to determine that the multi-phase motor has an error when a level of a predetermined signal of the hall detection signal and the BEMF detection signal is different from an expected value, at a timing of a predetermined edge of the other signal of the hall detection signal and the BEMF detection signal.

The initial state detecting unit may be configured to determine that the multi-phase motor is in a stopped state when an edge of the hall detection signal is not detected for a predetermined period of time.

The initial state detecting unit may be configured to determine that the multi-phase motor is in a stopped state when an edge of the BEMF detection signal is not detected for a predetermined period of time.

The initial state detecting unit may be configured to determine that the multi-phase motor is in a stopped state when the first time duration and the second time duration are not measured for a predetermined period of time.

The multi-phase motor may be a fan motor.

Another aspect of the present disclosure relates to a cooling device. The cooling device may include: a multi-phase fan motor; and any driving device described above for driving the multi-phase fan motor.

Yet another aspect of the present disclosure relates to an electronic apparatus. The electronic apparatus may include the cooling device described above.

Also, it is effective that any combination of the above components may be made, or the components or expressions of the present disclosure may be substituted by each other, as aspects of the present disclosure, among the method, apparatus, system, and the like.

DETAILED DESCRIPTION

Figure 1:
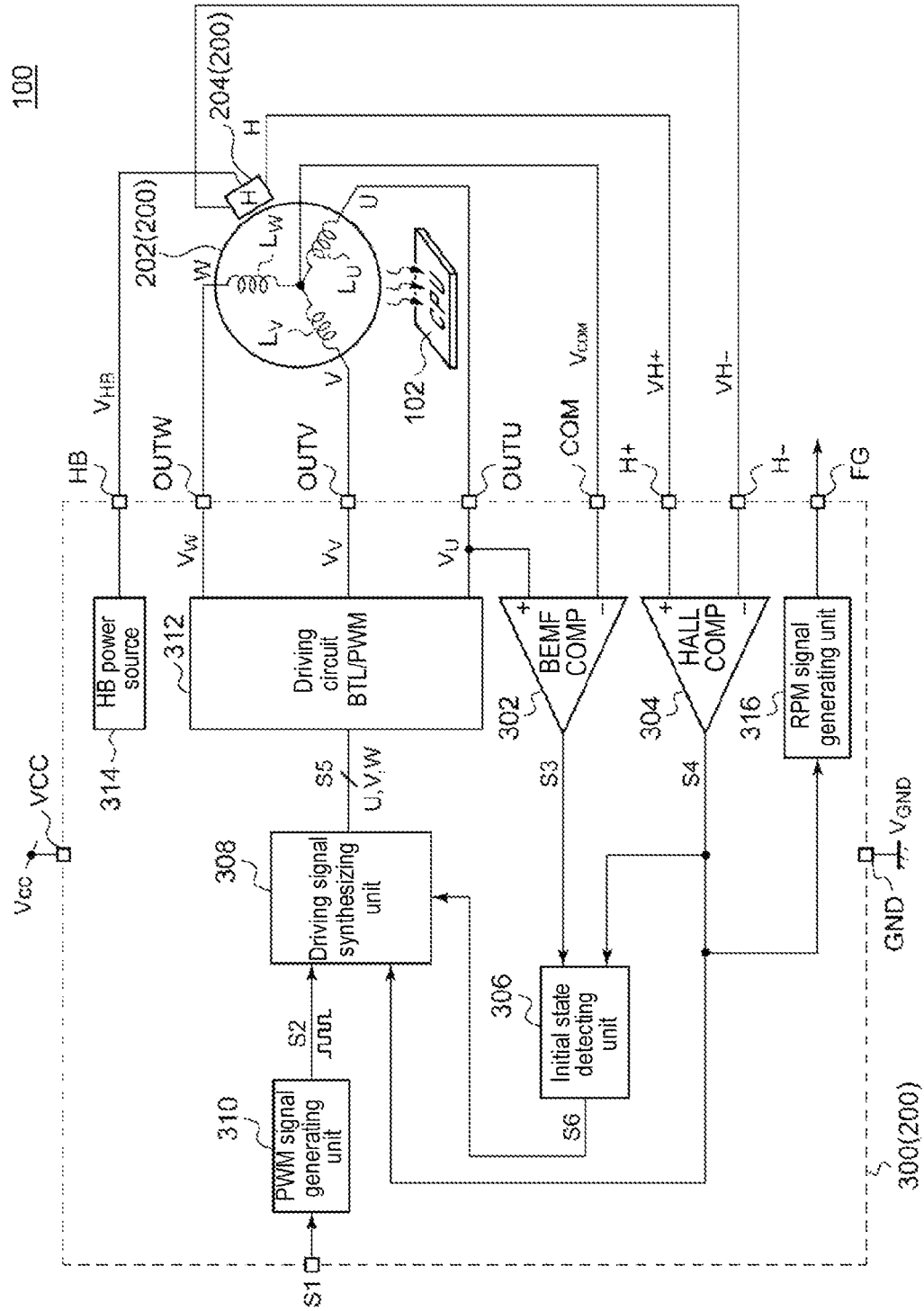
FIG. 1 is a block diagram illustrating an electronic apparatus including a cooling device according to an embodiment of the present disclosure.

Some embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration of the present disclosure, and the present disclosure is not limited to the features and combinations thereof described in the embodiments of the present disclosure and the embodiments alone cannot be necessarily construed to describe the spirit of the present disclosure.

In the present disclosure, the phrase "a connection of a member A and a member B" is intended to include a direct physical connection of the member A and the member B as well as an indirect connection thereof via other member as long as the other member has no substantial effect on the electrical connection of the member A and the member B or has no damage to functions and effects shown by a combination of the member A and the member B. Similarly, the phrase "an interposition of a member C between a member A and a member B" is intended to include a direct connection of the member A and the member C or a direct connection of the member B and the member C as well as an indirect connection thereof via other member as long as the other member has no substantial effect on the electrical connection of the member A, the member B and the member C or has no damage to functions and effects shown by a combination of the member A, the member B and the member C.

FIG. 1 is a block diagram illustrating an electronic apparatus 100 including a cooling device 200 according to an embodiment of the present disclosure. The electronic apparatus 100 may be a calculator such as a personal computer or a workstation, or a home appliance such as a refrigerator or a television, and include a cooling target, for example, a CPU 102. The cooling device 200 cools the CPU 102 by blowing air onto the CPU 102.

The cooling device 200 includes a fan motor 202, a hall element 204, and a driving device 300. The fan motor 202 is a 3-phase brushless DC motor and disposed in proximity to the CPU 102 which is a cooling target. The driving device 300 drives the fan motor 202 based on a control input signal (hereinafter, referred to simply as a "control signal") S1 for indicating a torque (or revolutions per minute (RPM)) of the fan motor 202. The cooling device 200 may be modularized to be commercially sold or distributed.

The fan motor 202 includes a star-connected U-phase coil $L_U$, a V-phase coil $L_V$, and an L-phase coils $L_W$ and a permanent magnet (not shown). The hall element 204 is installed in a predetermined location of the fan motor 20 and generates a pair of hall signals VH+ and VH− indicating positions of a rotor of the fan motor 202. A hall bias voltage $V_{HB}$ is supplied from the driving device 300 to the hall element 204. In the cooling device 200 according to this embodiment, it should be noted that the hall element 204 is prepared only for one phase, rather than for all three phases of the fan motor 202.

The driving device 300 may be a functional integrated circuit (IC) integrated on a single semiconductor substrate. A source voltage Vcc is applied to a power terminal VCC, and a ground voltage is supplied to a ground terminal GND. Further, output terminals OUTU, OUTV and OUTW of the driving device 300 are connected to one ends of the coils $L_U$, $L_V$ and $L_W$ of the fan motor 202, respectively, and a midpoint voltage Vcom of the fan motor 202 is input to a common terminal COM.

The driving device 300 includes a back electromotive force (BEMF) detecting comparator 302, a hall comparator 304, an initial state detecting unit 306, a driving signal synthesizing unit 308, a PWM signal generating unit 310, a driving circuit 312, and a hall bias (HB) power source 314.

The HB power source 314 generates a hall bias (HB) voltage $V_{HB}$ and supplies the generated HB voltage $V_{HB}$ to the hall element 204.

The PWM signal generating unit 310 receives a control signal S1 for indicating a torque (or revolutions per minute (RMP)) of the fan motor 202 from the outside, and generates a pulse width modulation (PWM) signal S2 that is pulse modulated based on the control signal S1. A duty ratio of the PWM signal S2 is varied depending on the control signal S1. Alternatively, a control signal S1 that is pulse width-modulated based on a target torque of the fan motor 202 may be input from the outside of the driving device 300 and then output as a PWM signal S2. Alternatively, the PWM signal generating unit 310 may receive an analog voltage depending on an ambient temperature Ta obtained using a thermistor (not shown) or the like, and generate a PWM signal S2 having a duty ratio corresponding to the analog voltage. Alternatively, the PWM signal generating unit 310 may receive a digital signal indicating a duty ratio from a host processor such as a CPU, and generate a PWM signal S2 depending on the digital signal.

The BEMF detecting comparator 302 is connected to one of the plurality of coils $L_U$ to $L_W$, for example, the coil $L_U$ in this embodiment. When the cooling device 200 starts, i.e., when the fan motor 202 starts to be driven, the BEMF detecting comparator 302 compares a voltage $V_U$ generated in one end of the coil $L_U$ with a midpoint voltage Vcom of the plurality of coils $L_U$ to $L_W$ to generate a BEMF detection signal S3 indicating a comparison result. In this case, since the BEMF detecting comparator 302 compares the voltages before the conduction is started by the driving circuit 312, the voltage $V_U$ at one end of the coil $L_U$ corresponds to BEMF.

The hall comparator 304 compares the pair of hall signals VH+ and VH− from the hall element 204 to generate a hall detection signal S4. For example, in case of VH+>VH−, the hall detection signal S4 has a high level, and in case of VH+<VH−, the hall detection signal S4 has a low level.

The hall detection signal S4 is supplied to the initial state detecting unit 306 and the driving signal synthesizing unit 308. The driving signal synthesizing unit 308 receives the hall detection signal S4 and the PWM signal S2, synthesizes them, and generates driving control signals $S5_U$, $S5_V$, and $S5_W$ for a U phase, a V phase, and a W phase, respectively. Specifically, the driving signal synthesizing unit 308 controls a current in synchronization with the hall detection signal S4 and controls the torque of the fan motor 202 based on the PWM signal S2. In addition, the driving signal synthesizing circuit 14 changes a driving sequence of the fan motor 202 based on the detection results from the initial state detecting unit 306 immediately after power is supplied to the driving device 300.

The driving circuit 312 applies driving voltages $V_U$, $V_V$, and $V_W$ to one ends of the respective coils $L_U$, $L_V$, and $L_W$ depending on the driving control signals $S5_U$, $S5_V$, and $S5_W$. The driving circuit 312 may PWM-drive (or switching-drive) the fan motor 202 or a bridged transless (BTL)-drive the fan motor 202.

When PWM driving the fan motor 202, the driving voltages $V_U$, $V_V$, and $V_W$ are switched between two values of the source voltage Vcc and the ground voltage $V_{GND}$ so as to be pulse width-modulated. A duty ratio of each of the driving voltages $V_U$, $V_V$, and $V_W$ is determined based on target torque (target RPM). Also, in order to suppress noise generated during phase conversion, a duty ratio of each driving voltage is gently changed in a phase shift period. The driving circuit 312 in case of the PWM driving is configured as a 3-phase bridge circuit.

When BTL driving the fan motor 202, envelope curves of the driving voltages $V_U$, $V_V$, and $V_W$ are gently shifted between the source voltage Vcc and the ground voltage $V_{GND}$. By shifting the envelope curves of the driving voltages of the respective phases based on a sine wave shape, a modified sine wave, a trapezoid wave, and the like, the noise may be further reduced than when PWM driving the fan motor 202. The waveforms of the envelope curves may be generated with reference to a predetermined table or may be generated based on the hall signals VH+ and VH−. Driving voltages of respective phases may be pulse width-modulated to have a duty ratio corresponding to target torque (target RPM). The driving circuit 312 in case of BTL driving is configured to include amplifiers installed in each of the U phase, the V phase, and the W phase. An output terminal of each amplifier is configured to have a push-pull form.

Also, the driving signal synthesizing unit 308 and the driving circuit 312 may use a known technique and a configuration and a driving method thereof are not particularly limited.

An RPM signal generating unit 316 generates an RPM signal FG that transitions every 180 machine angle (motor angle) of the fan motor 202, i.e., every half rotation of the fan motor 202, and outputs the RPM signal FG from an FG terminal. The RPM signal generating unit 316 generates the FG signal based on the hall detection signal S4.

When the fan motor 202 starts to be driven, the initial state detecting unit 306 detects a state (rotation state) of the fan motor 202 based on the BEMF detection signal S3 and the hall detection signal S4, generates a determination signal S6 indicating detection results, and outputs the determination signal S6 to the driving signal synthesizing unit 308. The driving signal synthesizing unit 308 selects a start sequence corresponding to the state of the fan motor 202 based on the determination signal S6 when the fan motor 202 starts to be driven.

The state of the fan motor 202 immediately after the fan motor 202 starts to be driven may be one of the following three states:

(1) Forward idle rotation state in which the fan motor 202 is idly rotating in a forward direction;

(2) Reverse idle rotation state in which the fan motor 202 is idly rotating in a reverse direction; and (3) Stopped state.

When the fan motor 202 is in a stopped state at a start-up (i.e., when the fan motor 202 starts to be driven), the driving signal synthesizing unit 308 executes a normal start sequence (3-phase start sequence). Further, when the fan motor 202 idly rotates in a forward direction at a start-up, the driving signal synthesizing unit 308 generates a driving control signal S5 in synchronization with the hall detection signal S4 or the FG signal. Also, when the fan motor 202 idly rotates in a reverse direction at a start-up, the driving signal synthesizing unit 308 stops the fan motor 202 based on a reverse rotation protecting process and then executes the 3-phase start sequence. Also, in each state, the details of the start sequence are not particularly limited and any suitable known technique may be used.

Figure 2A:
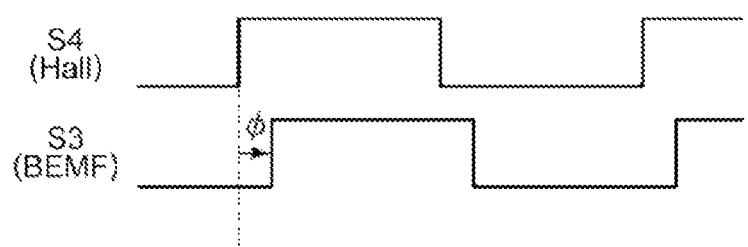
FIGS. 2A and 2B are operational waveform views in cases of a forward idle rotation and a reverse idle rotation.
Figure 2B:
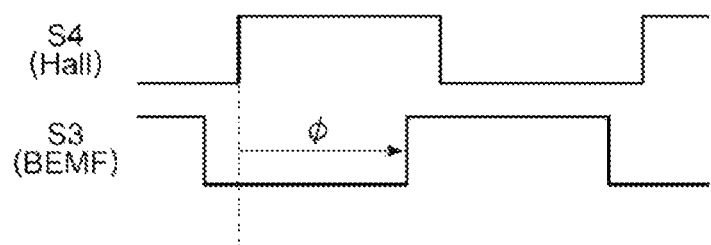

FIGS. 2A and 2B are operational waveform views in cases of a forward idle rotation and a reverse idle rotation.

A phase relationship between the hall detection signal S4 and the BEMF detection signal S3 is determined based on in which phase the BEMF is detected and in which coil of the fan motor 202 the hall element 204 is to be disposed. FIGS. 2A and 2B are merely illustrative. It should be noted that those illustrated in FIGS. 2A and 2B are merely phase relationships between the BEMF detection signal S3 based on the U-phase BEMF $V_U$ and the hall detection signal S4 obtained by the hall element 204 disposed between the U phase and the V phase.

As can be seen from FIGS. 2A and 2B, the hall detection signal S4 and the BEMF detection signal S3 have a first phase relationship in a forward idle rotation state and a second phase relationship in a reverse idle rotation state. That is, the magnitudes of a phase difference Φ of the BEMF detection signal S3 for the hall detection signal S4 in cases of the forward idle rotation state and the reverse idle rotation state are different. Thus, when the fan motor 202 starts to be driven, the initial state detecting unit 306 determines whether the fan motor 202 idly rotates in a forward direction or in a reverse direction based on a phase relationship between the BEMF detection signal S3 and the hall detection signal S4.

Figure 3:
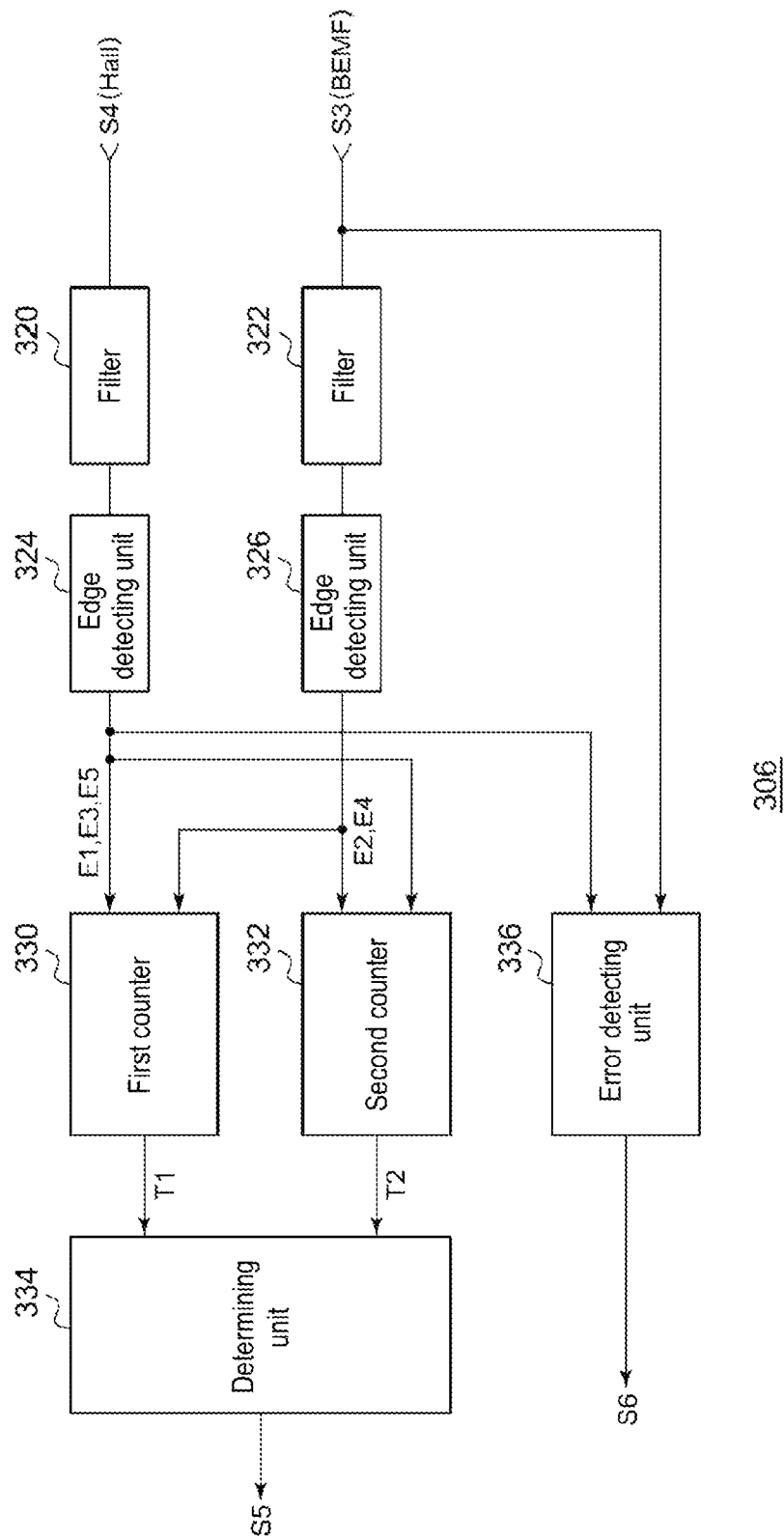
FIG. 3 is a block diagram illustrating a configuration example of an initial state detecting unit.

FIG. 3 is a block diagram illustrating a configuration example of the initial state detecting unit 306.

The initial state detecting unit 306 includes a first filter 320, a second filter 322, a first edge detecting unit 324, a second edge detecting unit 326, a first counter 330, a second counter 332, and a determining unit 334.

The first filter 320 and the second filter 322 remove noise of the hall detection signal S4 and noise of the BEMF detection signal S3, respectively. The first edge detecting unit 324 detects an edge of the hall detection signal S4, and the second edge detecting unit 326 detects an edge of the BEMF detection signal S3. Here, it is assumed that the first edge detecting unit 324 detects both a positive edge and a negative edge of the hall detection signal S4 and the second edge detecting unit 326 detects both a positive edge and a negative edge of the BEMF detection signal S3.

The first counter 330 measures at least one of (i) a time duration T1a from a first edge E1 (here, assumed as a positive edge), that is one of a positive edge and a negative edge of a predetermined signal (here, the hall detection signal S4) selected from the BEMF detection signal S3 and the hall detection signal S4, to a second edge E2 (here, a positive edge), that comes after the first edge E1 and is one of a positive edge and a negative edge of the other signal (here, the BEMF detection signal S3) different from the predetermined signal selected from the BEMF detection signal S3 and the hall detection signal S4, and (ii) a time duration T1b from a third edge E3 that is the other edge (here, a negative edge) and one of the positive and the negative edge of the predetermined signal (here, the hall detection signal S4) to a fourth edge E4 that is the other edge (here, a negative edge), that comes after the third edge and one of the positive edge and the negative edge, of the other signal (here, the BEMF detection signal S3) different from the predetermined signal. In this embodiment, the first counter 330 measures both of the two time durations T1a and T1b.

The second counter 332 measures at least one of (iii) a time duration T2a from the second edge E2 to the third edge E3 and (iv) a time duration T2b from the fourth edge E4 to a fifth edge E5 that is an edge (here, a positive edge), that comes after the fourth edge E4, which may be the positive edge and the negative edge of the predetermined signal (the hall detection signal S4). In this embodiment, the second counter 332 measures both of the two time durations T2a and T2b.

When an RPM of the fan motor 202 that idly rotates is constant, it may be understood that the time durations T1a and T1b measured by the first counter 330 are equal. Similarly, when the RPM of the fan motor 202 that idly rotates is constant, it may be understood that the time durations T2a and T2b measured by the second counter 332 are also equal. Here, the time duration measured by the first counter 330 is referred to as a first time duration T1 and the time duration measured by the second counter 332 is referred to as a second time duration T2.

The determining unit 334 determines a phase relationship between the BEMF detection signal S3 and the hall detection signal S4 based on a magnitude relationship between the first time duration T1 and the second time duration T2, and determines whether the fan motor 202 idly rotates in a forward direction or in a reverse direction.

The initial state detecting unit 306 may determine a stopped state of the fan motor 202 based on at least one of the following conditions:

(1) When an edge of the hall detection signal S4 is not detected for a predetermined period of time;

(2) When an edge of the BEMF detection signal S3 is not detected for a predetermined period of time; and (3) When the first time duration T1 and/or the second time duration T1 are not measured for a predetermined period of time.

Further, at a timing of a predetermined edge (for example, a positive edge) of a predetermined signal (for example, the hall detection signal S4) selected from the hall detection signal S4 and the BEMF detection signal S3, if a level of the other signal (i.e., the BEMF detection signal S3) different from the predetermined signal is different from an expectation value, the initial state detecting unit 306 determines that the operation has an error. When the driving circuit 312 is operating normally, the BEMF detection signal S3 should have a low level at a timing of the positive edge of the hall detection signal S4 in both the forward idle rotation and the reverse idle rotation, and thus, the expectation value is a low level.

In the above, the configurations of the cooling device 200 and the driving device 300 have been described. Operations of the cooling device 200 and the driving device 300 will now be described.

Figure 4A:
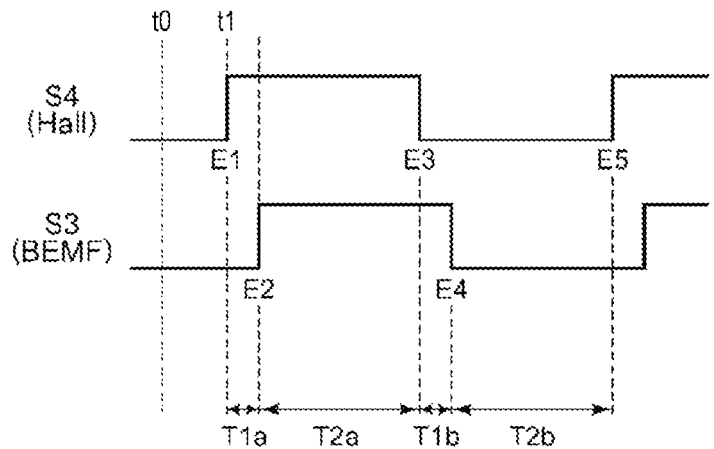
FIGS. 4A and 4B are views illustrating operations of the initial state detecting unit of FIG. 3.
Figure 4B:
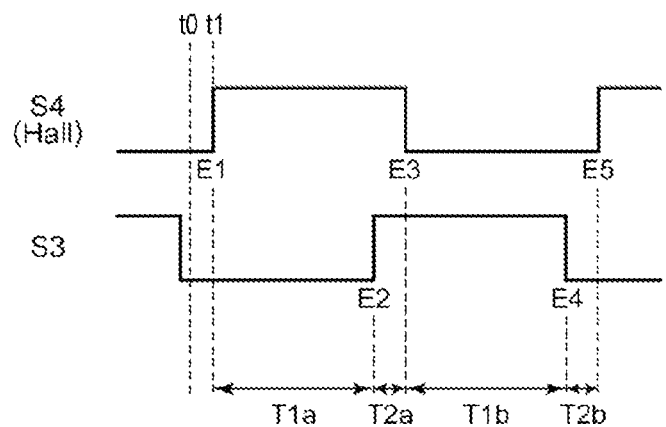

FIGS. 4A and 4B are views illustrating operations of the initial state detecting unit 306 of FIG. 3.

FIG. 4A illustrates an operation in case of the forward idle rotation. At time t0, the initial state detecting unit 306 starts its determining operation. At time t1, a first edge E1 is detected and the first counter 330 measures an elapsed time T1a from the first edge E1 to a next second edge E2. The second counter 332 measures an elapsed time T2a from the second edge E2 to a third edge E3.

As illustrated in FIG. 4A, in case of the forward idle rotation, T1 is smaller than T2 (T1<T2). Thus, in case of T1<T2, the determining unit 334 determines that the fan motor 202 idly rotates in a forward direction.

FIG. 4B illustrates an operation in case of the reverse idle rotation. At time t0, the initial state detecting unit 306 starts its determining operation. At time t1, a first edge E1 is detected and the first counter 330 measures an elapsed time T1a from the first edge E1 to a next second edge E2. The second counter 332 measures an elapsed time T2a from the second edge E2 to a third edge E3.

As illustrated in FIG. 4B, in case of the reverse idle rotation, T2 is smaller than T1 (T2<T1). Thus, in case of T2<T1, the determining unit 334 determines that the fan motor 202 idly rotates in a reverse direction.

After the first time T1 and the second time T2 are measured, the determining unit 334 compares the first time T1 and the second time T2 and determines an initial state of the fan motor 202.

For example, when the waveforms of FIG. 4A is generated, it is assumed that the initial state detecting unit 306 starts its determining operation before the edge E2 after the edge E1. In this case, first, the second time duration T2a is measured by the second counter 332 and then the first time duration T1b is measured by the first counter 330. In this case, the determining unit 334 can compare the second time duration T2a and the first time duration T1b at a timing of the edge E3.

Alternatively, when the initial state detecting unit 306 starts its determining operation between the second edge E2 and the third edge E3, the first time duration T1b is first measured by the first counter 330 and then the second time duration T2b is measured by the second counter 332. In this case, the determining unit 334 can compare the first time duration T1b and the second time duration T2b at a timing of an edge E5.

In the above, the operations of the cooling device 200 and the driving device 300 have been described.

In the driving device 300, when the fan motor 202 is normally driven, a rotation state of the fan motor 202 is detected using the hall detection signal S4, without using the BEMF detection signal S3. Thus, a non-conduction period, which is required for the conventional sensorless driving device using the BEMF detection signal S3, is not necessary and a generation of noise is not increased.

Further, a single hall element is satisfactory and cost effective when compared to the conventional driving device in which hall elements are installed in all of the phases U, V, and W, respectively.

Also, in the driving device 300, a state of the fan motor 202 at the time when the fan motor 202 starts to be driven may be detected by monitoring the BEMF detection signal S3 and the hall detection signal S4. Thus, the fan motor 202 may be started based on an appropriate sequence.

Also, the initial state detecting unit 306 of FIG. 3 enables the first counter 330 to measure both the first time durations T1a and T1b and the second counter 332 to measure both the second time durations T2a and T2b. Accordingly, when the first time duration T1 and the second time duration T2 are measured one time, respectively, the determining unit 334 may immediately determine whether the fan motor 202 idly rotates in a forward direction or in a reverse direction.

That is, if it is configured such that only the first time duration T1a and the second time duration T2a are measured, when the determining operation starts between the edges E1 and E2 of FIG. 4A, it should wait for the next cycle to determine the rotation state of the fan motor 202. In contrast, the determination may be made within the shorter period of time at the timing of edge E4 of FIG. 4A by using the initial state detecting unit 306 of FIG. 3.

In addition, an error of the driving device 300 may be detected by an error detecting unit 336. That is, in each of the forward idle rotation state and the reverse idle rotation state, the hall element 204 needs to be appropriately positioned in advance to obtain the waveforms illustrated in FIGS. 2A and 2B. If the hall element 204 deviates from a predetermined position, phase relationships between the hall detection signal S4 and the BEMF detection signal S3 are changed to be different from those illustrated in FIGS. 2A and 2B. Thus, an error resulting from a position shift or the like of the hall element 204 may be detected by checking a level of the other signal at a timing of an edge of one signal by the error detecting unit 336.

In the above, the present disclosure has been described based on the embodiment. It will be understood by a person skilled in the art that this embodiment is illustrative and combinations of respective components or respective processes may be variously modified and such modified examples are also within the scope of the present disclosure. Hereinafter, these modified examples will be described.

First Modified Example

The initial state detecting unit 306 may determine a phase relationship between the BEMF detection signal S3 and the hall detection signal S4, and a determining algorithm and configuration thereof are not limited to those of this embodiment. For example, the first counter 330 and the second counter 332 may be configured as a single counter. That is, a single counter may be used as the first counter 330 and the second counter 332 to count up during the first time duration T1 and count down during the second time duration T2, so that the first time duration T1 and the second time duration T2 may be compared based on a magnitude relationship between a count value when the counting operation was completed and an initial value when counting started.

Second Modified Example

Figure 5A:
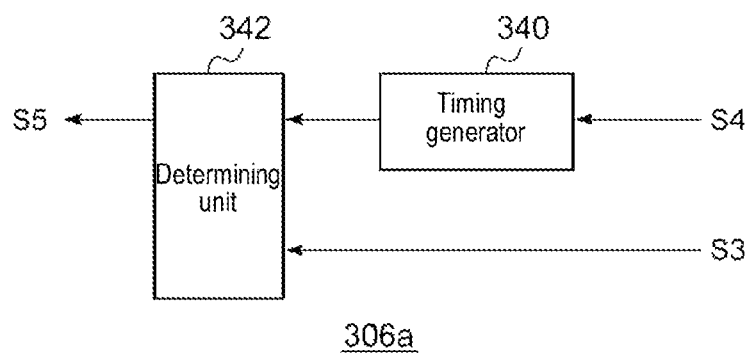
FIG. 5A is a block diagram and FIG. 5B is an operational waveform view of an initial state detecting unit according to a second modified example.
Figure 5B:
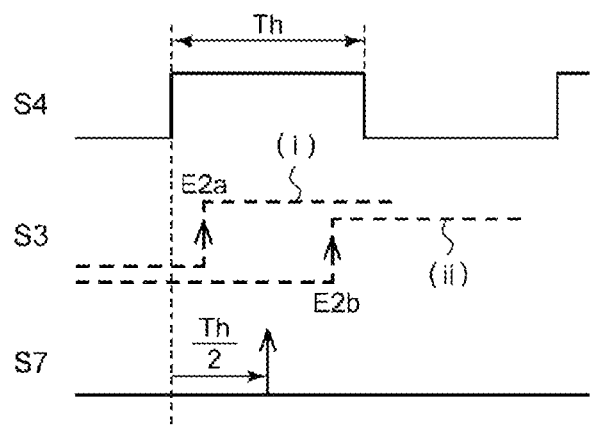

FIG. 5A is a block diagram and FIG. 5B is an operational waveform view of an initial state detecting unit 306a according to a second modified example.

As illustrated in FIG. 5A, the initial state detecting unit 306a includes a timing generator 340 and a determining unit 342. The timing generator 340 generates a strobe signal S7 asserted (for example, high level) in synchronization with a predetermined signal (here, the hall detection signal S4) selected from the BEMF detection signal S3 and the hall detection signal S4. The determining unit 342 determines whether the fan motor 202 idly rotates in a forward direction or in a reverse direction based on a level of the other signal (i.e., the BEMF detection signal S3) different from the predetermined signal selected from the BEMF detection signal S3 and the hall detection signal S4 at a timing at which the strobe signal S7 is asserted.

As illustrated in FIG. 5B, the strobe signal S7 is generated between a position of an edge E2a of the BEMF detection signal S3 (i) expected when the fan motor 202 idly rotates in a forward direction and an edge Eb2 of the BEMF detection signal S3 (ii) expected when the fan motor 202 idly rotates in a reverse direction. For example, the timing generator 340 may measure a half period Th of the hall detection signal S4 and assert the strobe signal S7 after the lapse of τ=Th/2 from the positive edge of the hall detection signal S4. Also, the time t is not limited to Th/2 and may be any time that comes between the edges E2a and E2b.

Third Modified Example

Figure 6A:
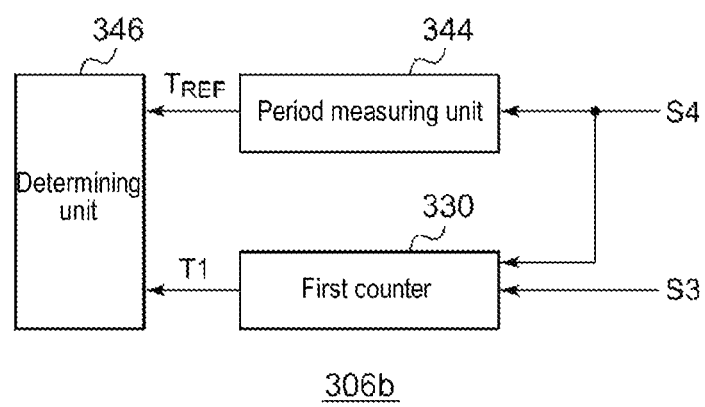
FIG. 6A is a block diagram and FIG. 6B is an operational waveform view of an initial state detecting unit according to a third modified example.
Figure 6B:
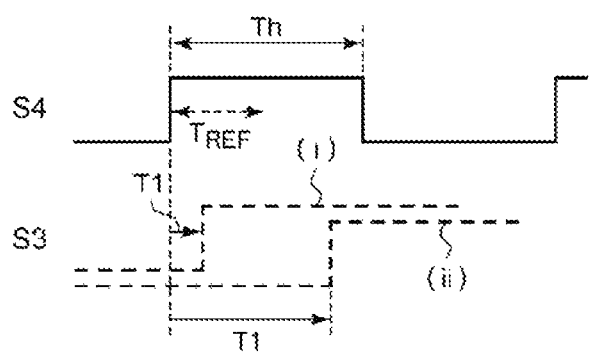

FIG. 6A is a block diagram and FIG. 6B is an operational waveform view of an initial state detecting unit 306b according to a third modified example.

The initial state detecting unit 306b includes a period measuring unit 344, a first counter 330, and a determining unit 346. The period measuring unit 344 measures a half period Th (or a full period) of a predetermined signal (here, assumed as the hall detection signal S4) selected from the BEMF detection signal S3 and the hall detection signal S4 to generate a reference time duration Tref proportional to the half period Th. For example, the reference time duration Tref may be half of the half period Th (Tref=Th/2).

Similar to the first counter 330 of FIG. 3, the first counter 330 measures a first time duration T1. The determining unit 346 determines whether the fan motor 202 idly rotates in a forward direction or in a reverse direction based on a magnitude relationship between the reference time duration Tref and the first time duration T1. In this example, in case of T1<Tref, the determining unit 346 may determine that the fan motor 202 idly rotates in a forward direction, and in case of T1>Tref, the determining unit 346 may determine that the fan motor 202 idly rotates in a reverse direction. The reference time duration Tref is not limited to Th/2 and may be set to have a value between the first time duration T1 when the fan motor 202 idly rotates in a forward direction and the second time duration T2 when the fan motor 202 idly rotates in a reverse direction.

Fourth Modified Example

In the embodiment, the case in which the hall comparator 304 is integrated in the driving device 300 has been described, but the present disclosure is not limited thereto and the hall comparator 304 may be installed outside of an IC of the driving device 300. For example, a hall IC formed by integrating the hall comparator 304 and the hall element 204 may be used.

Fifth Modified Example

In the embodiment, the 3-phase fan motor 202 has been described as an example, but the present disclosure is not limited thereto and may be used for driving a multi-phase motor having a plurality of coils.

Sixth Modified Example

In the embodiment, the case in which the cooling device 200 is installed in the electronic apparatus 100 to cool the CPU 102 has been described, but the purpose of the present disclosure is not limited thereto and may be used for various applications for cooling a heating element. More specifically, the purpose of the driving device 300 according to this embodiment may be used to drive various other motors, without being limited to the driving of the fan motor 202.

According to the present disclosure, it is possible to detect a state of a motor when it starts to be driven.

While certain embodiments have been described, these embodiments have been presented by way of example only, and are not intended to limit the scope of the disclosures. Indeed, the novel methods and devices described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A driving device of a multi-phase motor having a plurality of coils, the driving device comprising:
a back electromotive force (BEMF) detecting comparator connected to one of the plurality of coils to compare BEMF generated in one end of the one of the plurality of coils with a midpoint voltage of the plurality of coils and generate a BEMF detection signal indicating a comparison result, when the multi-phase motor starts to be driven; and
an initial state detecting unit configured to detect a rotation state of the multi-phase motor based on the BEMF detection signal and a hall detection signal corresponding to a result of comparing a pair of hall signals indicating a position of a rotor of the multi-phase motor, when the multi-phase motor starts to be driven,
wherein the initial state detecting unit is further configured to determine that the multi-phase motor has an error when a level of a predetermined signal selected from the hall detection signal and the BEMF detection signal is different from an expected value, at a timing of a predetermined edge of the other signal different from the predetermined signal selected from the hall detection signal and the BEMF detection signal.

2. The driving device of claim 1, wherein the initial state detecting unit is further configured to determine whether the multi-phase motor idly rotates in a forward direction or in a reverse direction based on a phase relationship between the hall detection signal and the BEMF detection signal, when the multi-phase motor starts to be driven.

3. The driving device of claim 2, wherein the initial state detecting unit comprises:
a first counter configured to measure a first time duration comprising at least one of (i) a time duration from a first edge that is one of a positive edge and a negative edge of a predetermined signal selected from the BEMF detection signal and the hall detection signal to a second edge that is a subsequent edge, that comes after the first edge and is one of a positive edge and a negative edge of the other signal different from the predetermined signal selected from the BEMF detection signal and the hall detection signal, and (ii) a time duration from a third edge that is the other edge of the predetermined one signal to a fourth edge that is the other edge, that comes after the third edge, of the other signal;
a second counter configured to measure a second time duration comprising at least one of (iii) a time duration from the second edge to the third edge, and (iv) a time duration from the fourth edge to a fifth edge that comes after the fourth edge and is one of the positive edge and the negative edge of the predetermined one signal; and
a determining unit configured to determine whether the multi-phase motor idly rotates in the forward direction or in the reverse direction, based on a magnitude relationship between the first time duration measured by the first counter and the second time duration measured by the second counter.

4. The driving device of claim 3, wherein when the first time duration and the second time duration are measured by the first counter and the second counter, respectively, the determining unit determines whether the multi-phase motor idly rotates in the forward direction or in the reverse direction.

5. The driving device of claim 3, wherein the initial state detecting unit is further configured to determine that the multi-phase motor is in a stopped state when the first time duration and the second time duration are not measured for a predetermined period of time.

6. The driving device of claim 2, wherein the initial state detecting unit comprises:

a timing generating unit configured to generate a strobe signal asserted in synchronization with a predetermined one of the BEMF detection signal and the hall detection signal; and a determining unit configured to determine whether the multi-phase motor idly rotates in the forward direction or in the reverse direction based on a level of the other signal of the BEMF detection signal and the hall detection signal at a timing at which the strobe signal is asserted.

7. The driving device of claim 2, wherein the initial state detecting unit comprises:

a period measuring unit configured to measure a period of a predetermined one signal of the BEMF detection signal and the hall detection signal and generate a reference time duration proportional to the period;

a first counter configured to measure a first time duration comprising at least one of (i) a time duration from a first edge that is one of a positive edge and a negative edge of the predetermined signal selected from the BEMF detection signal and the hall detection signal to a second edge that comes after the first edge and is one of a positive edge and a negative edge of the other signal different from the predetermined signal selected from the BEMF detection signal and the hall detection signal, and (ii) a time duration from a third edge that is the other edge of the predetermined signal to a fourth edge that is the other edge, that comes after the third edge, of the other signal; and a determining unit configured to determine whether the multi-phase motor idly rotates in the forward direction or in the reverse direction, based on a magnitude relationship between the first time duration measured by the first counter and the reference time duration.

8. The driving device of claim 1, wherein the initial state detecting unit is further configured to determine that the multi-phase motor is in a stopped state when an edge of the hall detection signal is not detected for a predetermined period of time.

9. The driving device of claim 1, wherein the initial state detecting unit is further configured to determine that the multi-phase motor is in a stopped state when an edge of the BEMF detection signal is not detected for a predetermined period of time.

10. The driving device of claim 1, further comprising a hall comparator configured to compare the pair of hall signals indicating the position of the rotor of the multi-phase motor from a hall element and generate the hall detection signal.

11. The driving device of claim 1, wherein the multi-phase motor is a fan motor.

12. A cooling device, comprising:
a multi-phase fan motor; and
the driving device according to claim 1 configured to drive the multi-phase fan motor.

13. An electronic apparatus comprising the cooling device according to claim 12.

14. A driving method of a multi-phase motor having a plurality of coils, the driving method comprising:

comparing back electromotive force (BEMF) generated in one end of one of the plurality of coils with a midpoint voltage of the plurality of coils to generate a BEMF detection signal indicating a comparison result, when the multi-phase motor starts to be driven; and generating a pair of hall signals indicating a position of a rotor of the multi-phase motor by a hall element;

comparing the pair of hall signals to generate a hall detection signal; and detecting a rotation state of the multi-phase motor based on the BEMF detection signal and the hall detection signal, when the multi-phase motor starts to be driven, wherein the detecting a rotation state of the multi-phase motor comprises determining that the multi-phase motor has an error when a level of a predetermined signal selected from the hall detection signal and the BEMF detection signal is different from an expected value, at a timing of a predetermined edge of the other signal different from the predetermined signal selected from the hall detection signal and the BEMF detection signal.

15. The driving method of claim 14, wherein the detecting a rotation state of the multi-phase motor further comprises determining whether the multi-phase motor idly rotates in a forward direction or in a reverse direction based on a phase relationship between the hall detection signal and the BEMF detection signal, when the multi-phase motor starts to be driven.

* * * * *